(12) United States Patent
Rocq et al.

(10) Patent No.: US 8,206,261 B2
(45) Date of Patent: Jun. 26, 2012

(54) METHOD OF TRANSMITTING THE POWER OF A HYBRID VEHICLE BETWEEN A HEAT ENGINE SHAFT AND A WHEEL AXLE SHAFT OF THE VEHICLE

(75) Inventors: Gaetan Rocq, La Boissiere-Ecole (FR); Yvan Le Neindre, Paris (FR); Cedric Launay, Issy-les-Moulineaux (FR)

(73) Assignee: Peugeot Citroen Automobiles SA, Velizy Villacoublay (FR)

( * ) Notice: Subject to any disclaimer, the term of this patent is extended or adjusted under 35 U.S.C. 154(b) by 1243 days.

(21) Appl. No.: 11/916,278

(22) PCT Filed: May 12, 2006

(86) PCT No.: PCT/FR2006/050439

§ 371 (c)(1),
(2), (4) Date: Nov. 30, 2007

(87) PCT Pub. No.: WO2007/003815

PCT Pub. Date: Jan. 11, 2007

(65) Prior Publication Data

US 2008/0200302 A1    Aug. 21, 2008

(30) Foreign Application Priority Data

May 30, 2005   (FR) ...................................... 05 51411

(51) Int. Cl.
*B60W 10/02* (2006.01)
*B60W 10/04* (2006.01)
*F02N 11/00* (2006.01)
*B60K 6/20* (2007.10)

(52) U.S. Cl. .................. 477/5; 477/6; 477/77; 477/167; 903/912; 903/946; 180/65.21

(58) Field of Classification Search ................. 180/65.1, 180/65.21; 477/5, 7, 77, 167, 6; 701/22
See application file for complete search history.

(56) References Cited

U.S. PATENT DOCUMENTS 6,018,198 A    1/2000   Tsuzuki et al.
(Continued)

FOREIGN PATENT DOCUMENTS

EP    0922600 A    6/1999

OTHER PUBLICATIONS

International Search Report mailed Dec. 20, 2006 in PCT/FR2006/050439.

*Primary Examiner* — J. Allen Shriver, II
*Assistant Examiner* — Bridget Avery
(74) *Attorney, Agent, or Firm* — Nicolas E. Seckel

(57) ABSTRACT

The invention relates to a method of transmitting power between a shaft of a heat engine and a wheel axle shaft of a hybrid vehicle. The inventive method involves the use of: a power transmission device comprising an electric machine which is connected to (i) the heat engine by means of a clutch and (ii) a wheel axle shaft; and a starting system which is mechanically independent of the electric machine and which is connected to the heat engine. According to the invention, the heat engine is started by applying a torque to the shaft simultaneously using the starting system and the clutch.

10 Claims, 4 Drawing Sheets

U.S. PATENT DOCUMENTS

Figure 1:
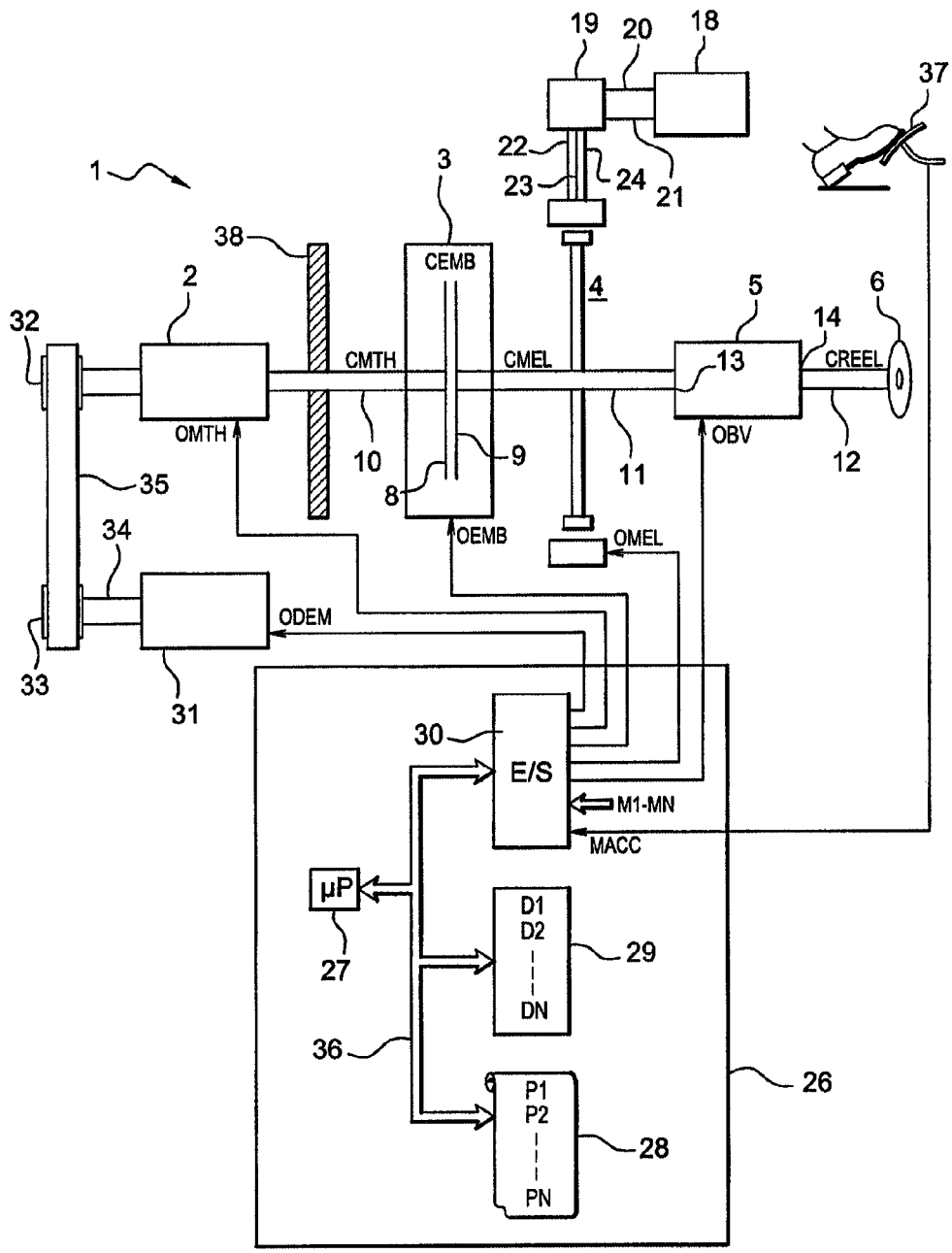

| | | |
|---|---|---|
| 6,077,186 A | 6/2000 | Kojima et al. |
| 6,083,139 A | 7/2000 | Deguchi et al. |
| 6,543,561 B1 | 4/2003 | Pels et al. |
| 6,593,713 B2 | 7/2003 | Morimoto et al. |
| 6,695,082 B2 * | 2/2004 | Bitsche et al. ............ 180/65.25 |
| 7,826,940 B2 * | 11/2010 | Miranda et al. ................ 701/22 |
| 2004/0060753 A1 * | 4/2004 | Ito et al. ...................... 180/65.2 |
| 2008/0115986 A1 * | 5/2008 | Rimaux et al. ............... 180/65.2 |

* cited by examiner

STATE OF THE ART

METHOD OF TRANSMITTING THE POWER OF A HYBRID VEHICLE BETWEEN A HEAT ENGINE SHAFT AND A WHEEL AXLE SHAFT OF THE VEHICLE

The present invention concerns a method for power transmission in a hybrid vehicle between a heat engine shaft and a wheel shaft of a vehicle. A particular purpose of the invention is to make the heat engine start quickly, in particular while ensuring continuity in the torque applied to the wheels. The invention has a particularly useful application in motor vehicles, but it could also be implemented in any kind of hybrid propulsion land vehicle.

Hybrid vehicles are known that use a combination of heat energy from a heat engine and electrical energy from an electrical machine to power their drive. This combining of energy sources is done in such a way as to optimize the fuel efficiency of such vehicles. This optimization of the fuel efficiency makes it possible for hybrid vehicles to pollute far less and use far less fuel than vehicles operating solely on heat energy.

In the present text, the term "start" is used to designate the initiation of rotation of the heat engine crankshaft. The term "set in motion" is used to designate the initial movement of the vehicle from a zero speed to a non-zero speed.

Several types of hybrid vehicle power transmission devices have been particularly well developed.

Hybrid transmission devices having a heat engine and a single electrical machine are known. A shaft of this heat engine and a shaft of this electrical machine are connected to one another via a clutch. A speed control unit such as a gearbox is also connected to the electrical machine shaft and the wheel shaft of the vehicle. Such a device is operable in two different modes. In a first mode, known as "electrical mode", the electrical machine alone powers the vehicle drive. In a second mode, known as "hybrid mode", the electrical machine and the heat engine together power the vehicle drive.

In hybrid mode, the power supplied by the electrical machine makes it possible to adjust the torque applied to the wheel shaft while also adjusting the torque and speed of the heat engine to an operating point at which the vehicle's fuel consumption is optimized.

Each member of the transmission device—heat engine, clutch, electrical machine and speed control unit—is controlled by a local control device, which is in turn commanded by an electronic control unit known as a "supervising computer". This computer can be independent or integrated into another computer, such as the engine control computer, for example. This supervising computer executes programs, in particular to synchronize the actions of the various members of the transmission device with one another. This synchronization is carried out in such a way as to best fulfill a driver request for acceleration.

More precisely, depending on the acceleration desired by the user and vehicle driving conditions, the supervising computer controls the various members of the device, selects the operating mode, coordinates the transitional phases of the various members, and chooses operating points for the engine and the electrical machine. The term "driving conditions" includes vehicle parameters as well as external parameters that can influence the operation of the vehicle. For example, the speed and the acceleration of the vehicle are vehicle parameters, whereas the slope of a hill and road surface moisture are external parameters.

FIG. 1 shows a schematic representation of a transmission device 1 according to the state of the art. This transmission device 1 has a heat engine 2, a clutch 3, an electrical machine 4, a speed control unit consisting of a gearbox 5, for example, and wheels 6, which make up a traction drive.

More precisely, the clutch 3 has a first clutch plate 8 and a second clutch plate 9. The first clutch plate 8 is connected to a shaft 10 of the heat engine 2. And the second clutch plate 9 is connected to a shaft 11 of the electrical machine 4. Additionally, the shaft 11 of the electrical machine 4 and a shaft 12 of the wheels 6 are respectively connected to an input 13 and an output 14 of the gearbox 5.

As previously mentioned, the transmission device 1 is operable in two different modes. In electrical mode, the shaft 12 of the wheels 6 is driven by the electrical machine 4 alone. The clutch 3 is then released, so that the heat engine 2 shaft 10 and the shaft 11 of the machine 4 are not coupled to one another. In this electrical mode, the machine 4 generally operates as an engine. In a particular embodiment, then, the machine 4 draws energy from a storage system 18 such as a battery, notably through an inverter 19. The battery 18 delivers a DC voltage signal. In electrical mode, the inverter 19 thus transforms the DC voltage signal detectable between the battery terminals 20 and 21 into AC voltage signals, which are applied to phases 22-24 of the machine 4.

In hybrid mode, the shaft 12 of the wheels 6 is driven by the heat engine 2 and the electrical machine 4. The clutch 3 is then engaged, so that the heat engine 2 shaft 10 and the wheel 6 shaft 12 are coupled to one another. The machine 4 acts as an engine or as a generator and transmits power to the shaft 12 of the wheels 6 in order to adjust the detectable torque on this shaft 12 to a setpoint torque. The machine thus exchanges energy with the battery 18 constantly.

In hybrid mode and electrical mode, during battery recharge phases that coincide with a deceleration of the vehicle, the electrical machine 4 acts as a generator. During these recharge phases, the electrical machine 4 supplies energy to the battery 18. The inverter 19 then transforms the AC voltage signals detectable on phases 22-24 of the electrical machine 4 into a DC voltage signal that is applied to the terminals 20 and 21 of the battery 18.

In addition, the transmission device 1 has an independent starting system 31. This starting system 31 is connected to the heat engine 2 via a drive system 32, 33, 35 and drives its rotation in order to start it. The starting system 31 is mechanically independent of the machine 4. That is, the system 31 starts the engine 2 without withdrawing power from the traction drive, and particularly without withdrawing torque from the wheel 6 shaft 12.

In a particular embodiment, the drive system has a first pulley 32 attached to one end of its shaft 10. And the starting system 31 has a second pulley 33 attached to one end of its shaft 34. A belt 35 runs through the grooves in these two pulleys 32 and 33 so as to connect the starting system 31 to the heat engine 2.

The transmission device 1 can also have a flywheel 38. This flywheel 38 performs a function of filtering out cyclical variations in order to ensure a continuous transmission of torque from the heat engine 2 to the shaft 6 of the wheels 12.

In practice, the electrical machine 4 is generally a three-phase synchronous machine. Machines of this type feature a compact design and good output.

The clutch 3 is a wet or dry plate clutch. As a variant, the clutch 3 has more than two plates.

Additionally, the transmission device 1 has a dedicated supervising computer 26. This supervising computer 26 has a microprocessor 27, a program memory 28, a data store 29, and an input-output interface 30, which are connected to one another via a communication bus 36.

The data store 29 contains data D1-DN, which correspond in particular to the characteristics of the various members of the transmission device 1: namely, the heat engine 2, the clutch 3, the electrical machine 4, the gearbox 5, and the starting system 31. Some of the data D1-DN, for example, represent the response times of these members. Other data D1-DN, for example, represent maximum and minimum torques that can be applied to shafts associated with these members.

The input-output interface 30 receives signals M1-MN detectable at sensor outputs (not shown). These sensors make it possible to detect the vehicle driving conditions. For example, acceleration and speed sensors make it possible to know the acceleration and the speed of the vehicle, respectively, at any given moment. A slope sensor can tell whether the vehicle is on a slope or not. In addition, the interface 30 receives a signal MACC representing a torque at the wheel requested by a driver. This signal MACC is a function of how far down an accelerator pedal 37 is pushed.

According to the data D1-DN, the driving conditions, and the acceleration requested by the driver, the microprocessor 27 executes one of the programs P1-PN that initiates the operation of the transmission device 1 in a particular mode, and adjusts the detectable torque on the shaft 12 of the wheels 6. More precisely, when one of the programs P1-PN is executed, the microprocessor 27 commands the interface 30 in such a way that signals OMTH, OEMB, OMEL, OBV and ODEM are sent to the heat engine 2, the clutch 3, the electrical machine 4, the gearbox 5, and the starting system 31, respectively, to control them.

In addition, the members 2-5 and 31 of the transmission device 1 each have an internal control system that regulates the detectable torque values on shafts associated with these members.

In one example, with the driver requesting a slight acceleration, the supervising computer 26 commands the various members 2-5 and 31 so as to make the transmission device 1 operate in electrical mode. The torque applied to the shaft 12 of the wheels 6 is then equal to the detectable torque on the shaft 11 of the electrical machine 4, adjusted by a gear ratio. In contrast, with a strong acceleration request, the computer 26 commands the various members 2-5 and 31 so as to make the device 1 operate in hybrid mode. The torque applied to the shaft 12 of the wheels 6 is then equal to the detectable torque on the shaft 11 of the electrical machine 4, which is then equal to the sum of the detectable torques on the heat engine 2 shaft 10 and the machine 4 shaft.

When the vehicle changes from electrical mode to hybrid mode, there is a transitional regime during which the torque of the heat engine 2 is not available. That is, during this transitional regime, the heat engine 2 starts and its shaft 10 begins to couple with the shaft 11 of the electrical machine 4, during which time no torque from the heat engine 2 is being transmitted to the shaft 12 of the wheels 6. This transitional regime is particularly critical, since it can occur more than two hundred times per driving hour, regardless of the vehicle speed or the gear engaged.

During the transitional regime, the supervising computer 26 must therefore control the starting system 31 accurately, so that the driver is not aware that the vehicle is changing modes. The starting time of the heat engine 2 must therefore be minimal during an acceleration. Moreover, the level of acceleration requested by the driver must be provided throughout the transitional regime, and the acoustic comfort of the driver ensured.

In existing transmission devices 1, in order to change from an electrical mode to a hybrid mode, the starting system 31 transmits a breakaway torque to the heat engine 2. This breakaway torque corresponds to the torque to apply to the heat engine 2 shaft in order to run the heat engine through its first compression strokes to make it autonomous. However, this method does not allow the engine 2 to start quickly enough to keep the driver from feeling the engine starting vibrations, as will be seen below.

Figure 2:
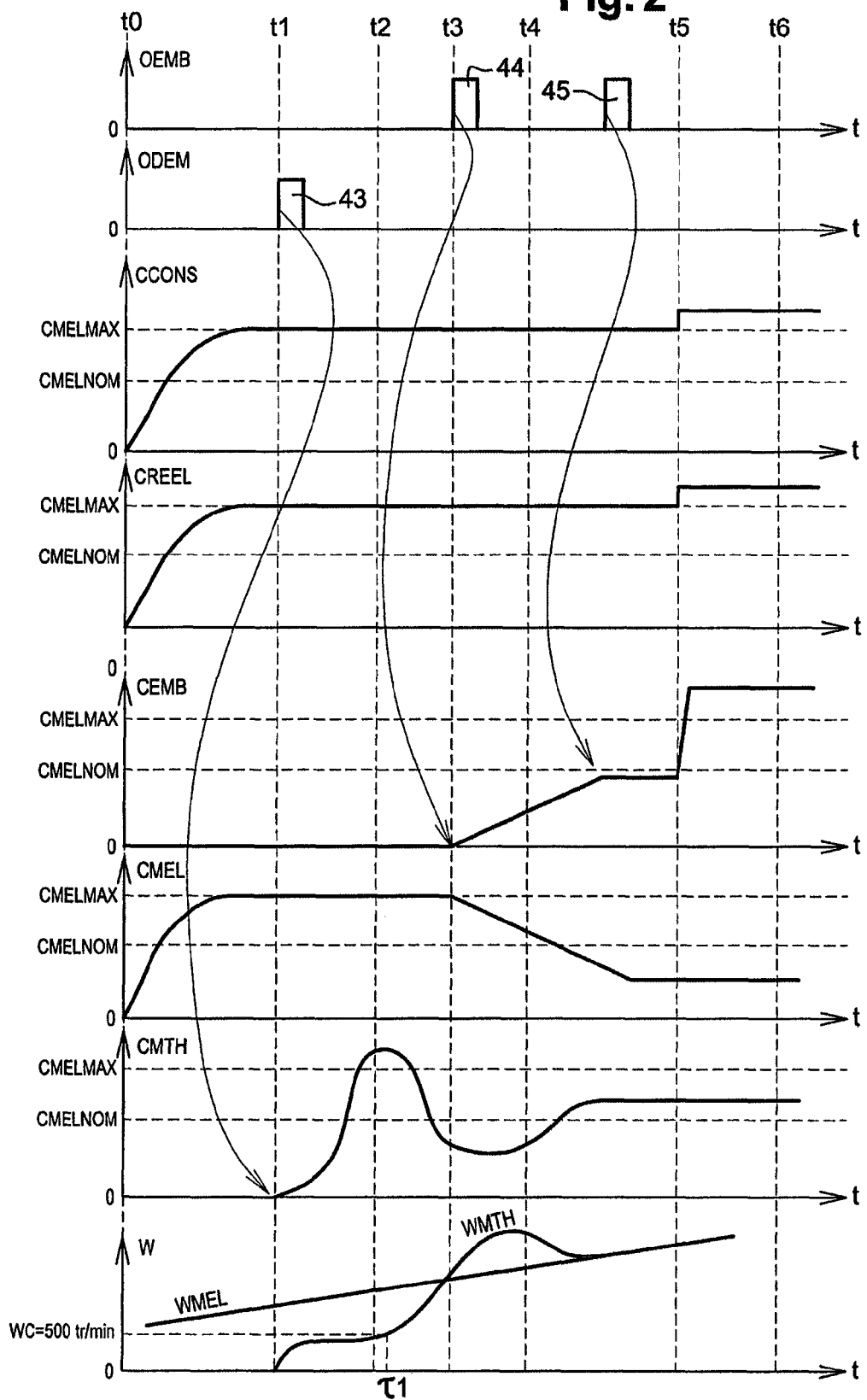

FIG. 2 shows some timing diagrams of detectable signals on the various members 2-5 of the transmission device 1 when the system 31 alone is used to start the engine 2.

More precisely, FIG. 2 shows the torque signals CEMB, CMEL and CMTH, which represent the detectable torques on the clutch 3, on the machine shaft 11, and on the engine shaft 10, respectively.

FIG. 2 also shows the change over time in torque signals CCONS and CREEL, representing the setpoint torque to apply to the shaft 12 of wheels 6 and the actual torque detectable on this shaft 12, respectively. The torque setpoint signal CCONS is established in particular from the acceleration signal MACC and the signals M1-MN coming from the sensors.

The signals OEMB and ODEM are sent from the computer 26 to the clutch 3 and the starting system 31 to command them. For greater simplicity, the signals OMTH, OMEL and OBV are not shown.

FIG. 2 also shows on a single timing diagram the change over time in the rotation speed WMEL of the electrical machine 4 and the rotation speed WMTH of the heat engine 2.

In the explanations that follow, the value CMELMAX represents the peak or maximum value of the torque of the electrical machine 4, and the value CMELNOM represents the nominal torque of this machine 4.

At instant t0, the machine 4 has already been powered on; that is, it is already rotating. Thus, the vehicle has already been set in motion; in other words, it is already moving. The heat engine 2 is off, and therefore, it has a zero rotation speed WMTH and a zero torque CMTH at instant t0.

Between instants t0 and t1, the setpoint torque CCONS increases to a point where, at instant t1, it has already reached the peak torque CMELMAX of the machine 4. Between instants t0 and t1, the torque CMEL of the machine 4 increases so as to comply with the requested setpoint torque CCONS. Thus, the torque CREEL measured on the shaft 12 of wheels 6 matches the setpoint torque CCONS. The rotation speed WMEL of the machine 4 is non-null and increases linearly. The heat engine 2 is still off, and its shaft 10 is not coupled with the shaft 11 of the electrical machine 4. The engine 2 thus has both a zero torque CMTH and a zero rotation speed WMTH.

At instant t1, when the driver depresses the accelerator pedal 37 in a particular way, the computer 26 receives a signal MACC representing a request to change the vehicle mode.

Between instants t1 and t2, the transmission device 1 thus enters a first transitional phase. In this first phase, the torque signals CCONS, CREEL and CMEL are always equal to the peak torque CMELMAX of the machine 4. At the completion of one of the programs P1-PN by the computer 26, a signal 43 is sent to the starting system 31. This signal 43 commands the system 31, which drives the rotation of the heat engine 2 to start it. A torque signal CMTH is then detectable, corresponding to the starting torque of this heat engine 2. The engine 2 then has a rotation speed WMTH that is increasing, although it remains lower than that of the electrical machine 4. The heat engine 2 thus runs through its first compression strokes, but it is not yet transmitting any torque to the shaft 12, since it is not yet coupled with the shaft 11 of the machine 4.

Between instants t2 and t3, the transmission device 1 enters a second transitional phase. In this second phase, the torque signals CCONS, CREEL, CMEL always have values equal to CMELMAX. The torque signal CMTH of the heat engine 2 decreases slightly, while the rotation speed WMTH of this engine 2 increases to reach the rotation speed WMEL of the electrical machine 4 at instant t3. There is no detectable torque CEMB on the clutch 3. The purpose of this second phase is to raise the engine 2 speed to allow the clutch plates 8 and 9 to begin to slide relative to one another, as will be seen below.

Between instants t3 and t4, the transmission device 1 enters a third transitional phase. In this third phase, the torque signal CCONS is equal to the peak torque CMELMAX of the machine 4. Furthermore, in this third phase, as soon as the rotation speed WMTH of the engine 2 is higher than that WMEL of the machine 4, a signal 44 is sent to the clutch 3 by the computer 26. This signal 44 commands the clutch plates 8 and 9 to begin sliding relative to one another. The engine 2 then transmits part of its torque CMTH to the shaft 12 via the clutch 3. The detectable torque on the clutch 3 thus increases in a calibratable manner, and in one example, linearly, while the torque signal CMEL of the machine 4 decreases correspondingly. The torque CREEL is thus always equal to the setpoint torque CCONS.

Between instants t4 and t5, the transmission device 1 enters a fourth transitional phase. In this fourth phase, first the engine comes into synchronization, and second, the clutch 3 engages. When the heat engine 2 comes into synchronization, its rotation speed WMTH converges toward that WMEL of the electrical machine 4, and when these two speeds are substantially equal, a signal 45 is sent to the clutch 3 to command it to engage. The clutch torque CEMB increases thusly until this clutch 3 engages, and then levels off. The torque signal CMEL of the machine 4 decreases roughly symmetrically with respect to the clutch 3 torque CEMB. The torque signal CREEL and the torque signal CCONS are equal to the peak torque CMELMAX.

Between instants t5 and t6, the transmission device 1 enters a fifth transitional phase. In this fifth phase, the torque setpoint signal CCONS increases slightly, in a stepwise manner, for example. The engine members 2 and 4 of the device 1 then converge toward their optimal torque setpoint in terms of the heat engine 2 fuel consumption, if they have not already reached it. In addition, the clutch torque signal CEMB increases to keep the clutch 3 engaged. The rotation speeds WMTH and WMEL of the engine 2 and the machine 4 increase with the speed of the vehicle.

This method makes it possible to disassociate the heat engine starting processes from the drive processes. However, using the starting system by itself requires the engine 2 to operate for a long time at speeds at which its vibrations can be felt by the driver.

More precisely, the torque of the starting system 31 is high when its speed is less than a critical speed WC, whose value is between 300 and 400 rpm, whereas the torque is low when the system 31 is operating at a speed higher than this critical speed WC. The heat engine 2 thus operates at a speed less than the critical speed WC while it is starting, until it becomes autonomous. When the engine speed is less than the critical speed of 300 to 400 rpm, the engine compression/expansion cycles generate low-frequency vibrations that are transmitted to the vehicle chassis via the engine suspensions. These vibrations can thus be felt by the driver, which can be unpleasant.

The invention thus proposes to solve these problems of starting time and heat engine availability during a change of mode of the vehicle.

To this end, in the invention the starting system and the clutch are used in combination to start the heat engine. This way, when changing from electrical mode to hybrid mode, the clutch and the starting system simultaneously transmit the breakaway torque to the heat engine to start it.

In this way, the torque is increased to the engine while it is off. Actually, the torque detectable on the engine shaft at the moment the engine starts is equal to the sum of the torque detectable on the starting system shaft and part of the torque detectable on the wheel shaft. Thus, the crankshaft revs up faster, which shortens the period during which the engine runs at the speed where the engine vibrations are most noticeable. Reducing the time it takes to start the engine rotating also makes it possible to significantly reduce the total engine starting time. Reducing the starting time thus yields greater flexibility in arbitrating engine starting decisions, and therefore yields the best possible compromise between vehicle fuel consumption and driver comfort.

The starting method according to the invention can also make engine starting more robust and reliable. That is, with the invention, engine starting is less dependent on the characteristics and availability of a starting system alone, since the clutch is involved.

Furthermore, the method according to the invention can be used advantageously to reduce the operational performance of the starting system and reduce the cost of the transmission. That is, since part of the breakaway torque is applied by the clutch, it is possible to use a smaller, less expensive starting system than one that would start the engine by itself.

The torque applied to the engine shaft by the clutch is withdrawn from the wheel shaft. While the breakaway torque is being transmitted, the electrical machine thus applies a compensation torque to the wheel shaft so that there are no sudden variations in this torque, which could be unpleasant for the driver.

To this end, the electrical machine operates at a lower torque than its peak torque, so that it has sufficient reserve torque to offset the torque withdrawn by the clutch. In a particular embodiment, the electrical machine operates—except during a transitional phase—with its nominal torque as the maximum in order to be able to increase to a higher torque, allowing it to offset the torque withdrawn by the clutch.

The invention thus concerns a method for power transmission between a heat engine shaft and a wheel shaft of a hybrid vehicle, in which a power transmission device is used that has an electrical machine connected both to the heat engine through a clutch and to a wheel shaft, and a starting system that is mechanically independent of the electrical machine and connected to the heat engine, and in which the heat engine is started by transmitting a breakaway torque to the shaft of this engine, characterized in that:

in order to transmit the breakaway torque, a torque is applied to the engine shaft by the starting system and the clutch simultaneously.

Figure 3:
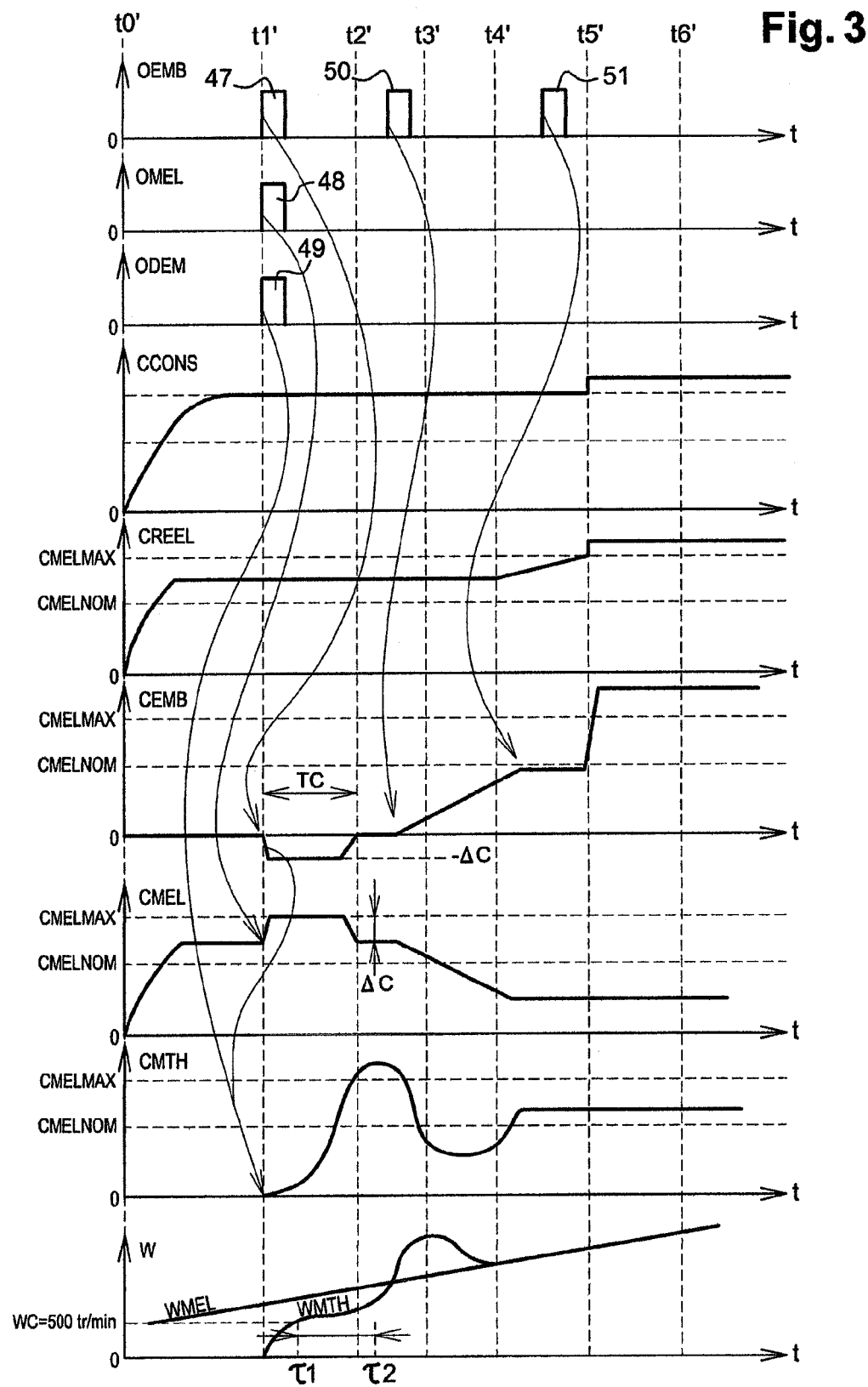
Figure 4:
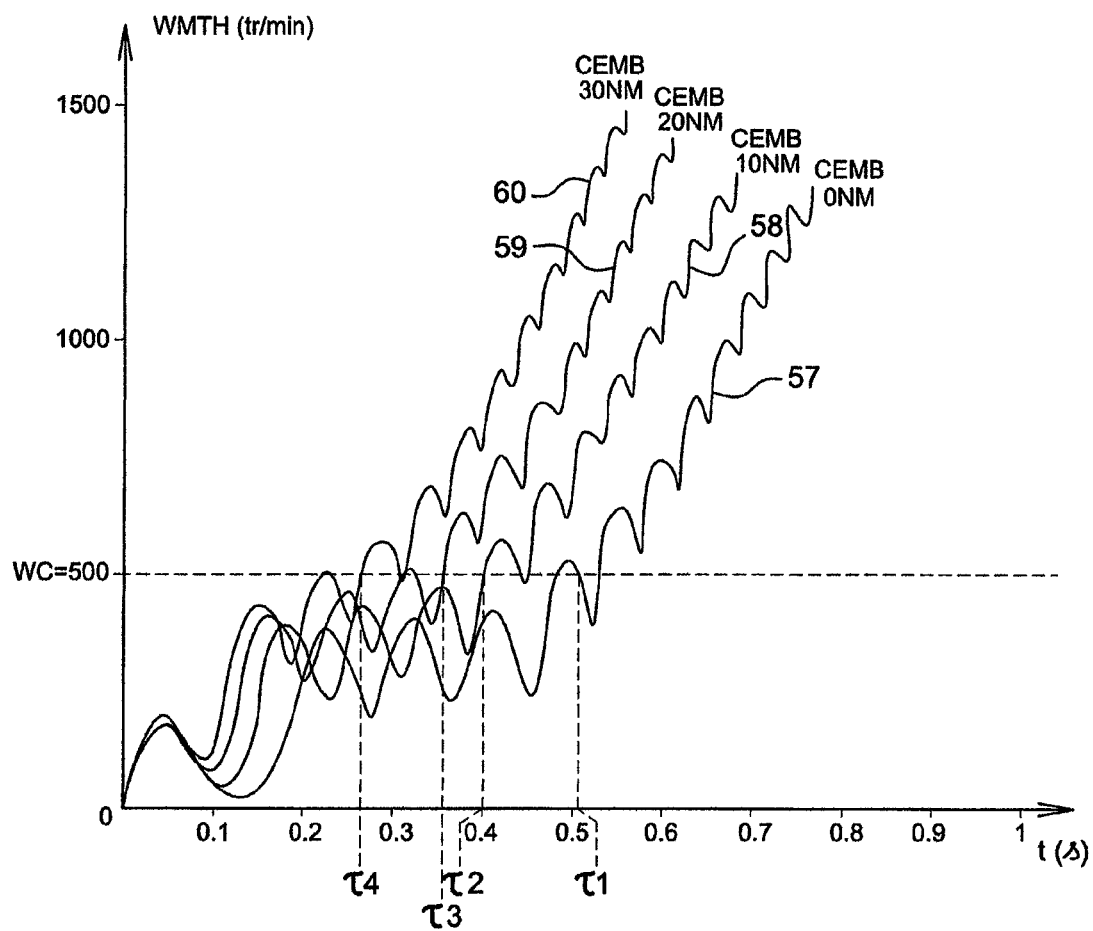

The following description and accompanying figures will make the invention more easily understood. These figures are given as an illustration, and are in no way an exhaustive representation of the invention. These figures show:

FIG. 1 (already described): a schematic representation of a power transmission device according to the state of the art;

FIG. 2 (already described): timing diagrams of signals detectable on members of the transmission device according to the state of the art during a change of mode, with a method according to the state of the art;

FIG. 3: timing diagrams of signals detectable on members of the transmission device according to the state of the art during a change of mode, with a method according to the invention;

FIG. 4: graphs of the rotation speed of the heat engine as a function of time for different breakaway torque values applied to the shaft of this engine by the clutch.

FIG. 3 shows timing diagrams of detectable signals on the various members 2-5 of the transmission device 1 when the method according to the invention is implemented: that is, when the independent system 31 and the clutch 3 together apply the breakaway torque to the engine shaft to start it. The initial conditions and the torque setpoint signal CCONS are the same as in FIG. 2 so that the various signals can be compared.

More precisely, between instants t0' and t1', the torque setpoint signal CCONS progressively increases, particularly in correspondence with an acceleration request from the driver. This setpoint torque CCONS increases to the point where at instant t1', it has already reached the peak torque CMELMAX of the electrical machine 4. Moreover, between instants t0' and t1', the machine 4 has a torque CMEL that increases to level off at a lower torque value than the value of its peak torque CMELMAX. The rotation speed WMEL of the machine 4 is non-null and increases linearly. The heat engine 2 is off and its shaft 10 is not coupled with the shaft 11 of the machine 4. The engine 2 thus has both a zero torque CMTH and a zero rotation speed WMTH. The torque signal CREEL measured on the shaft 12 of the wheels 6 parallels the torque signal CMEL. There is no detectable torque on the clutch 3.

At instant t1', when a change in the angle of the pedal is greater than a threshold value, the computer 26 receives a signal MACC for a change of vehicle mode.

Between instants t1' and t2', the transmission device 1 then enters a first transitional phase. In this first phase, the setpoint torque CCONS is always roughly equal to the peak torque CMELMAX. At instant t1', three signals 47-49 are sent simultaneously by the computer 26 to the clutch 3, the electrical machine 4, and the starting system 31, respectively. Signals 47 and 49 command the clutch 3 and the starting system 31, respectively, so that together they simultaneously transmit the breakaway torque to the heat engine 2 to make it turn over. This breakaway torque CARR is transmitted partly by the system 31 and partly by the clutch 3. Thus, adjusted for gear ratios, the sum of the torque −ΔC applied by the clutch 3 and the torque applied by the starting system 31 to the heat engine 2 shaft 10 is at least equal to the minimum breakaway torque of this engine. The torque −ΔC is withdrawn from the wheel 6 shaft 12 by the clutch 3.

The signal 48 is sent to the machine 4 so as to make the torque of this machine 4 increase by a compensation torque value ΔC that offsets the torque withdrawn from the shaft 12 by the clutch 3. The compensation torque ΔC applied to the shaft 12 by the machine 4 preferably has the same value as the torque −ΔC applied by the clutch 3. Furthermore, the compensation torque ΔC is applied to the shaft 12 by the machine 4 during the same time period TC as that during which the clutch 3 withdraws the torque ΔC from the wheel shaft 6.

To enable it to provide the compensation torque ΔC, the electrical machine 4 operates at a lower torque than its peak torque CMELMAX in electrical mode. And during the change of mode the electrical machine 4 operates at no more than its maximum torque CMELMAX so that the clutch 3 can provide the highest torque possible to the engine 2.

Furthermore, during this first transitional phase a heat engine 2 torque signal CMTH is detectable, which corresponds to its starting torque. The engine 2 then has a rotation speed WMTH that is increasing, but remains lower than the rotation speed WMEL of the machine 4. The engine 2 is still not transmitting its torque to the wheel 6 shaft 12, since it is not coupled with the shaft 11 of the machine 4. The torque CREEL is thus equal to the torque of the machine 4. The purpose of the first transitional phase is to let the engine 2 run through its first compression strokes and bring it up to a high enough speed WMTH to make it autonomous. As soon as the engine reaches this autonomous speed, the starting system 31 is generally cut off.

Between instants t2' and t3', the transmission device 1 enters a second transitional phase. In this second phase, the setpoint torque CCONS is always roughly equal to CMELMAX. The engine speed WMTH is still increasing, and at the moment when the rotation speed WMTH transmitted to the clutch plate 9 by the engine 2 is equal to that transmitted to the plate 8 by the machine 4, the clutch 3 is released. That is, once the engine 2 is autonomous, the clutch 3 is released at the moment the speeds intersect so as to avoid a potential torque discontinuity from reversing the torque transmitted by the clutch 3.

The rotation speed WMEL of the shaft 11 of the electrical machine 4 increases linearly, while the rotation speed WMTH of the shaft 10 of the heat engine 2 increases to reach the rotation speed WMEL of the electrical machine 4.

As soon as the rotation speed WMTH transmitted to the first clutch plate 8 by the engine 2 is higher than that transmitted to the second plate 9 by the machine 4, a signal 50 is sent to the clutch 3 by the supervising computer 26. This signal 50 commands the clutch plates 8 and 9 to begin sliding relative to one another. The engine 2 then transmits part of its torque CMTH to the shaft 12 of the wheels 6 via the clutch 3. The detectable torque signal CEMB on the clutch 3 then increases linearly in a calibratable manner, while the torque signal CMEL of the machine 4 decreases in a roughly symmetrical manner with respect to the torque signal CEMB.

Between instants t3' and t4', the transmission device 1 enters a third transitional phase. What essentially happens in this third phase is that the engine comes into synchronization, during which the rotation speed transmitted to the first clutch plate 8 by the heat engine converges toward the rotation speed transmitted to the second plate 9 by the electrical machine 4. The setpoint torque CCONS is always roughly equal to the peak torque CMELMAX.

Between instants t4' and t5', the transmission device 1 enters a fourth transitional phase. What essentially happens in this fourth transitional phase is that the clutch 3 engages. More precisely, when the rotation speeds of the clutch plates 8 and 9, driven by the engine 2 and the machine 4, respectively, are roughly equal, a signal 51 is sent to the clutch 3 by the computer 26. This signal 51 commands this clutch 3 to engage.

The rotation speeds of the engine WMTH and of the machine WMEL then become identical. For example, this signal 51 is sent when the difference between the rotation speed WMTH of the heat engine 2 and the rotation speed WMEL of the electrical machine 4 has a lower absolute value than a value between 0 and 15% of the rotation speed WMEL of the machine 4. In addition, the torque signal CEMB of the clutch 3 increases then levels off, while the torque signal CMEL decreases then levels off.

Between instants t5' and t6', the transmission device 1 enters a fifth transitional control phase. In this fifth phase, the setpoint torque CCONS increases slightly, in a calibrated manner—stepwise, for example. The engine members 2 and 4 of the device 1 then converge toward their optimal torque setpoint signal, if they have not already reached it. The clutch is kept engaged and its torque CEMB increases so as to overtake the torque CMTH. The rotation speeds of the heat engine WMTH and the electrical machine WMEL increase with the vehicle speed. The torque signal CREEL parallels the changes in the torque setpoint signal CCONS.

By using the clutch and the starting system in combination, it is seen that the engine 2 revs up more quickly than it does when the starting system alone is used to transmit the breakaway torque. That is, with the method according to the invention, the engine 2 runs at a lower speed than the critical speed WC for a time period τ2 that is less than the time period τ1, as will be seen below.

FIG. 4 shows a graph of the increase in the rotation speed WMTH of the engine 2 according to different torque levels applied by the clutch 3, by means of curves 57-60.

The curves 57-60 each oscillate around a mean value. These oscillations are due to a particular sampling pattern of the engine rotation speed values.

More precisely, curve 57 represents the rotation speed of the heat engine 2 when a zero torque is applied by the clutch 3. This curve 57 corresponds to the method according to the state of the art in which the starting system 31 alone is used to start the engine 2. In this method, the engine 2 operates below the critical speed WC of 500 rpm for a time period τ1 equal to approximately 0.5 s.

Curves 58, 59 and 60 represent the change in the rotation speed of the heat engine 2 when a torque of 10, 20 or 30 N·m is applied to the heat engine 2 shaft by the clutch 3, in addition to the torque applied by the starting system 31.

For a torque of 10 N·m applied by the clutch, the heat engine 2 operates below the critical speed WC for a time period τ2 equal to approximately 0.4 s. For a torque of 20 N·m applied by the clutch, the heat engine 2 operates below the critical speed WC for a time period τ3 equal to approximately 0.35 s. For a torque of 30 N·m applied by the clutch, the heat engine 2 operates below the critical speed WC for a time period τ4 equal to approximately 0.25 s.

Thus, it can be seen that with a torque of 30 N·m applied to its shaft, the heat engine 2 operates at a speed of less than 500 rpm (critical speed) for half the time that it does when the starting system 31 alone is used to start the heat engine 2.

In practice, it is preferable to have the clutch apply a torque between 10 and 40 N·m to the engine shaft.

The method according to the invention thus makes it possible to decrease the overall starting time. That is, the crankshaft is brought up to the speed of the wheel shaft more quickly, which makes it possible to anticipate the clutch coming into synchronization.

Moreover, starting is more reliable because supplementing the torque supplied by the starting system with a torque transmitted by the clutch makes it possible to quickly exceed the compression torque of the engine. This way, we reduce the probability of a start failure due to an unfavorable initial crankshaft position.

The invention claimed is:

1. Method for power transmission between a shaft of a heat engine and a shaft of wheels of a hybrid vehicle, in which a power transmission device is used that has an electrical machine connected both to the heat engine through a clutch and to a shaft of wheels, and a starting system that is mechanically independent of the electrical machine and connected to the heat engine, in which:

the heat engine is started by transmitting a breakaway torque to the shaft of this engine, the breakaway torque is transmitted by applying a torque to the engine shaft using the starting system and the clutch simultaneously, the torque applied by the clutch is offset by a compensation torque applied by the electrical machine to the wheel shaft, so as to reduce the loss of torque to the wheels, and having started the heat engine and powered on the electrical machine, a rotation speed of the heat engine is increased until the speed transmitted to a first plate of the clutch by this heat engine is higher than that transmitted by the electrical machine to a second plate of the clutch.

2. Method according to claim 1, in which:
the electrical machine is already rotating when the breakaway torque is transmitted.

3. Method according to claim 1, in which:
a compensation torque is applied that has the same value as the torque applied by the clutch.

4. Method according to claim 1, in which:
the compensation torque is applied during the same time period as that during which the torque is applied to the heat engine shaft by the clutch.

5. Method according to claim 1, in which:
at the moment the breakaway torque is transmitted, the electrical machine is made to operate at no more than its peak torque.

6. Method according to claim 1, in which:
during the moment when the rotation speed transmitted to the first clutch plate by the engine is equal to that transmitted to the second clutch plate by the electrical machine, the clutch is released.

7. Method according to claim 1, in which:
as soon as the rotation speed transmitted to the first clutch plate by the heat engine is higher than that transmitted to the second plate by the electrical machine, these plates are made to slide relative to one another.

8. Method according to claim 1, in which:
having engaged the clutch, the heat engine torque and the electrical machine torque are made to converge toward their optimal setpoint value in terms of the fuel consumption of the heat engine.

9. Method according to claim 1, in which:
once the heat engine has started, it is allowed to run through its first compression strokes in order to be autonomous, and then the starting system is cut off.

10. Method according to claim 7, in which:
the rotation speed transmitted to the first clutch plate by the heat engine is made to converge toward the rotation speed transmitted to the second plate by the electrical machine, and the clutch is engaged when these rotation speeds are substantially equal.

* * * * *